(12) United States Patent
Fu

(10) Patent No.: US 11,350,637 B1
(45) Date of Patent: Jun. 7, 2022

(54) DETACHABLE AND EASILY CLEANABLE MEAT TENDERIZER

(71) Applicant: Lijun Fu, Yuyao (CN)

(72) Inventor: Lijun Fu, Yuyao (CN)

(*) Notice: Subject to any disclaimer, the term of this patent is extended or adjusted under 35 U.S.C. 154(b) by 12 days.

(21) Appl. No.: 17/153,112

(22) Filed: Jan. 20, 2021

(51) Int. Cl.
*A22C 9/00* (2006.01)

(52) U.S. Cl.
CPC .................. *A22C 9/008* (2013.01)

(58) Field of Classification Search
CPC .................. A22C 9/00; A22C 9/08
USPC .................. 452/141, 146, 147
See application file for complete search history.

(56) References Cited

U.S. PATENT DOCUMENTS

| | | | | |
|---|---|---|---|---|
| 4,463,476 A | * | 8/1984 | Jaccard | A22C 9/008 452/146 |
| 8,911,285 B1 | * | 12/2014 | Gorowski | A22C 9/008 452/146 |
| 2004/0094645 A1 | * | 5/2004 | Kujawski | A22C 9/008 241/283 |
| 2005/0239388 A1 | * | 10/2005 | Gorowski | A22C 9/008 452/141 |
| 2010/0105307 A1 | * | 4/2010 | Zimmerman | A22C 9/008 452/141 |
| 2012/0270485 A1 | * | 10/2012 | Doyle | A22C 9/001 452/144 |
| 2017/0071219 A1 | * | 3/2017 | Tanaka | A22C 9/008 |

* cited by examiner

*Primary Examiner* — Richard T Price, Jr.
(74) *Attorney, Agent, or Firm* — Muncy, Geissler, Olds & Lowe, P.C.

(57) ABSTRACT

The invention discloses a detachable and easily cleanable meat tenderizer, which includes a housing, a blade holder, a blade and a baffle plate. The housing is provided with a chamber that is sized to fit the blade holder. The housing is internally provided with a clamping-type locking device which includes a clamping-type locking body and a return spring. The clamping-type locking body is provided with a clamping groove at a lower end thereof, a return post at the rear thereof and a control button in the front thereof. A clamping portion adapted to the clamping groove is arranged at an upper part of the blade holder, and the blade holder is connected to the housing when the clamping portion is clamped into the clamping groove. Limiting cavities are arranged on both sides of the housing. Guide posts are arranged on both sides of the blade, one end of the guide post is located in the limiting cavity of the housing, and the other end of the guide post is detachably connected to the baffle plate. The limiting cavity is internally provided with a return device. The baffle plate is provided with a slot for the blade to pass through. The housing, the blade and the baffle plate of the meat tenderizer of the utility model are detachably connected to facilitate the cleaning of various parts of the meat tenderizer; therefore, the meat tenderizer is cleaner and more hygienic when used.

10 Claims, 4 Drawing Sheets

DETACHABLE AND EASILY CLEANABLE MEAT TENDERIZER

FIELD OF THE INVENTION

The utility model relates to the technical field of meat tenderizers, and particularly discloses a meat tenderizer that can be disassembled and is convenient to clean.

BACKGROUND OF THE INVENTION

Meat ingredients have become an indispensable type of dishes in people's daily diet because they are rich in indispensable nutrients such as protein for humans. Since the muscle fibers of meat, especially those of red meat such as beef, are relatively rough and hard, the meat is not easy to be tasty and well-cooked upon cooking. To solve this problem, people have begun to process meat with meat tenderizers. Meat tenderizers are a kind of appliances with blades at their front ends, wherein the blades are pierced into meat to cut meat fibers, so that meat products can be better flavored when cured, and are easier to be cooked. Some meat tenderizers also have baffle plates at their front ends. However, meat tenderizers in the prior art are often nondetachable, which makes it difficult to clean the meat tenderizers, especially their blades. The blades that have not been washed clean are liable to breed bacteria which have an adverse effect on food. Some meat tenderizers also have a problem that water is retained in housings but cannot be discharged.

SUMMARY OF THE INVENTION

The utility model aims to solve one of the above technical problems in the related art at least to a certain extent. For this reason, the utility model provides a meat tenderizer having a housing, a blade and a baffle plate that can be disassembled to facilitate cleaning after use and allow more thorough cleaning.

The utility model specifically employs the following technical solution: a detachable and easily cleanable meat tenderizer includes a housing, a blade holder, a blade and a baffle plate. One end of the blade is mounted in the blade holder. The housing is provided with a chamber that is sized to fit the blade holder. The housing is internally provided with a clamping-type locking device at a position corresponding to an upper part of the chamber; and the clamping-type locking device includes a clamping-type locking body and a return spring. The clamping-type locking body is provided with a clamping groove at a lower end thereof, and the clamping groove extends into the chamber. The clamping-type locking body is provided with a return post at the rear thereof and the return spring is sleeved on the return post. The clamping-type locking body is provided with a control button in the front thereof, the housing is provided with an opening at a position corresponding to the control button, and the control button extends to the outside of the housing through the opening. A clamping portion adapted to the clamping groove is arranged at an upper part of the blade holder, and the blade holder is connected to the housing when the clamping portion is clamped into the clamping groove. Limiting cavities are arranged on both sides of the housing. Guide posts are arranged on both sides of the blade, one end of the guide post is located in the limiting cavity of the housing, and the other end of the guide post is detachably connected to the baffle plate. The limiting cavity is internally provided with a return device which includes a limiting block and a compression spring sleeved on the limiting block, and the compression spring is connected to the guide post. The baffle plate is provided with a slot for the blade to pass through.

Through the above technical solution, the detachable connection between the housing and the blade can be achieved by the clamping-type locking device. When the control button is pressed, the return spring is compressed and the clamping groove moves towards the compression direction. At this time, the blade holder is placed, the control button is released, then the return spring is reset and the clamping groove is also reset accordingly. The clamping groove is clamped with the clamping portion when moving to the position of the clamping portion, and then the blade holder and the blade thereon are connected to the housing. If it is necessary to disassemble the blade holder and the blade thereon from the housing, the control button is pressed again, then the clamping groove is disengaged from the clamping portion, and the blade holder and the blade are taken out.

Further, a connecting piece is arranged in the middle of the clamping portion, a concave opening is arranged at a position of the clamping groove corresponding to the connecting piece, and the connecting piece is clamped into the concave opening when the clamping portion is clamped into the clamping groove, so that the clamping portion and the clamping groove are connected more firmly.

Further, a side edge of the blade holder protrudes outwards to form a clamping strip, and the chamber is provided with a socket for inserting the clamping strip at a position corresponding to the clamping strip.

Further, the housing is internally provided with a positioning rod which is inserted into the return post, and when the control button is pressed, the return post moves in the direction of the positioning rod. The positioning post is used to control the direction of each movement of the return post.

Further, a clamping post is arranged at one end of the guide post connected to the baffle plate, a tail part of the clamping post takes the shape of an inverted hemisphere, buckling devices are arranged on both sides of the baffle plate at positions corresponding to the clamping posts, the buckling device includes a spring and a buckling body with an opening in the middle thereof, the buckling body has limiting holes on both sides thereof, the spring has one end abutting on an inner side wall of the baffle plate and the other end abutting in the limiting hole, an upper end of the buckling body protrudes upwards to form a button, the opening of the buckling body takes the shape of one large circle intersecting with one small circle, with the large circle on the top and the small circle at the bottom, the radius of the large circle is greater than that of the tail part of the clamping post, the radius of the small circle is smaller than that of the tail part of the clamping post, the baffle plate is provided with a through hole at a position corresponding to the small circle, and the clamping post of the guide post passes through the through hole on the baffle plate and is connected to the buckling device.

Through the above technical solution, when the button is pressed down, the buckling device compresses the spring, the large circle is moved into the position of the through hole, and then the guide post is placed into the buckling device through the through hole. When the button is released, the spring is reset and the small circle returns to the position of the through hole. Since the radius of the small circle is smaller than that of the tail part of the clamping post, the clamping post is locked in the buckling device, thus enabling the connection between the guide post and the bottom plate. When it is necessary to disassemble the guide post from the bottom plate, the button is pressed again, then the large circle moves to the position of the through hole, and the clamping post is disengaged from the large circle.

Further, the housing is divided into a first housing and a second housing, wherein the first housing is provided with an insertion hole with two open ends, the second housing is provided with an insertion rod with an internal thread, the insertion rod is inserted into the insertion hole, and then the first housing and the second housing are fixed by a screw. The housing is detachably designed to facilitate the maintenance and replacement of parts and components later.

Further, the housing is provided with several drainage channels, and stop strips are arranged in the housing at positions corresponding to the drainage channels. The purpose of the drainage channels is to discharge the water retained in the housing. Moreover, the stop strips can prevent foreign matter from entering the housing through the drainage channels and therefore have the function of dust prevention.

Further, the blade holder is equipped with three rows of blades arranged in parallel; the blades located in the blade holder are separated by partitions; the blade holder is internally provided with mounting posts; and the blades and the partitions are both provided with perforations, and are sleeved on the mounting posts through the perforations so as to be fixed in the blade holder.

Further, the part of the blade that is not mounted in the blade holder is divided into blade needles arranged at equal intervals.

Further, the meat tenderizer also includes a protective cover which is connected to a lower end of the housing; the blade, the guide posts and the baffle plate are wrapped inside the protective cover; and an antislip strip is arranged on an outer surface of the lower end of the housing.

Further, the housing has a handle integrally formed with the housing at an upper end thereof. During use, a user can hold the handle at the upper part to facilitate operation.

The beneficial effects of the utility model are as follows: the detachable connection among the housing, the blade and the baffle plate of the meat tenderizer is achieved to facilitate the cleaning of various parts of the meat tenderizer; therefore, the meat tenderizer is cleaner and more hygienic when used;

the detachable connection is achieved by the clamping-type locking device and the buckling device, which are simple in structure, convenient to operate and low in cost;

the upper end of the housing is designed as a handle, which facilitates hand holding and makes it easier to firmly hold the meat tenderizer;

the water retained in the housing can be discharged more effectively through the drainage channels on the housing to keep the inside of the housing dry, thus prolonging the service life of the parts; and the use of the protective cover reduces the probability of accidentally scratching a user by the blade, so that the meat tenderizer can be used more safely and the protective cover can also protect the parts therein.

Figure 1:
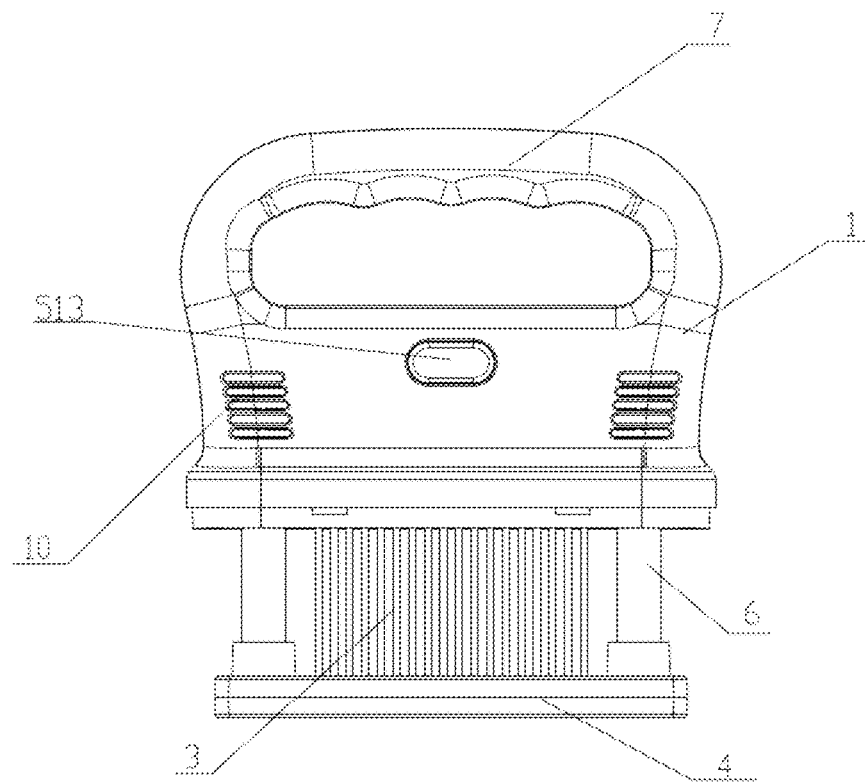
FIG. 1 is a front view of a first embodiment of a meat tenderizer of the utility model.

In the Figures: 1. housing; 11. first housing; 12. second housing; 13. chamber; 14. limiting cavity; 2. blade holder; 21. clamping portion; 211. connecting piece; 22. partition; 23. clamping strip; 3. blade; 4. baffle plate; 41. through hole; 42. slot; 5. clamping-type locking device; 51. clamping-type locking body; 511. clamping groove; 5111. concave opening; 512. return post; 513. control button; 52. return spring; 6. guide post; 61. clamping block; 62. clamping post; 7. handle; 8. return device; 81. limiting block; 82. compression spring; 9. buckling device; 91. spring; 92. buckling body; 921. button; 10. drainage channel; 101. stop strip; 102. protective cover.

DETAILED DESCRIPTION OF THE INVENTION

In order that those skilled in the art can better understand the technical solutions in the present application, the technical solutions in the embodiments of the present application will be clearly and completely described below with reference to the drawings in the embodiments of the present application. It is apparent that the described embodiments are only part of rather than all of the embodiments in the present application.

It should be understood that the orientation or positional relationships indicated by the terms such as "upper", "lower", "front", "rear", "left", "right", "top", "bottom", "inner" and "outer" are based on the orientation or positional relationships shown in the drawings, which are only intended to facilitate describing the present application and simplify description, and do not indicate or imply that the device or element involved must have a specific orientation and be constructed and operated in a specific orientation, and therefore cannot be construed as limiting the present application.

Unless otherwise explicitly specified and defined, the terms "mounted", "connected" and "connection" should be interpreted broadly. For example, it may be a fixed connection, a detachable connection or an integral connection.

Figure 2:
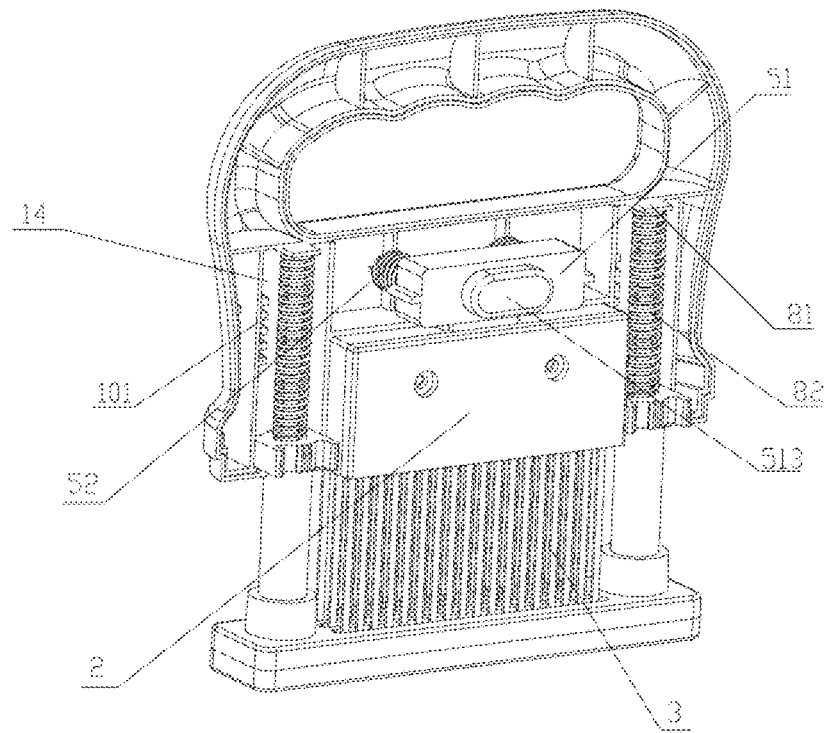
FIG. 2 is a schematic view of the internal structure of the meat tenderizer with a first housing removed in the first embodiment of the meat tenderizer of the utility model.
Figure 3:
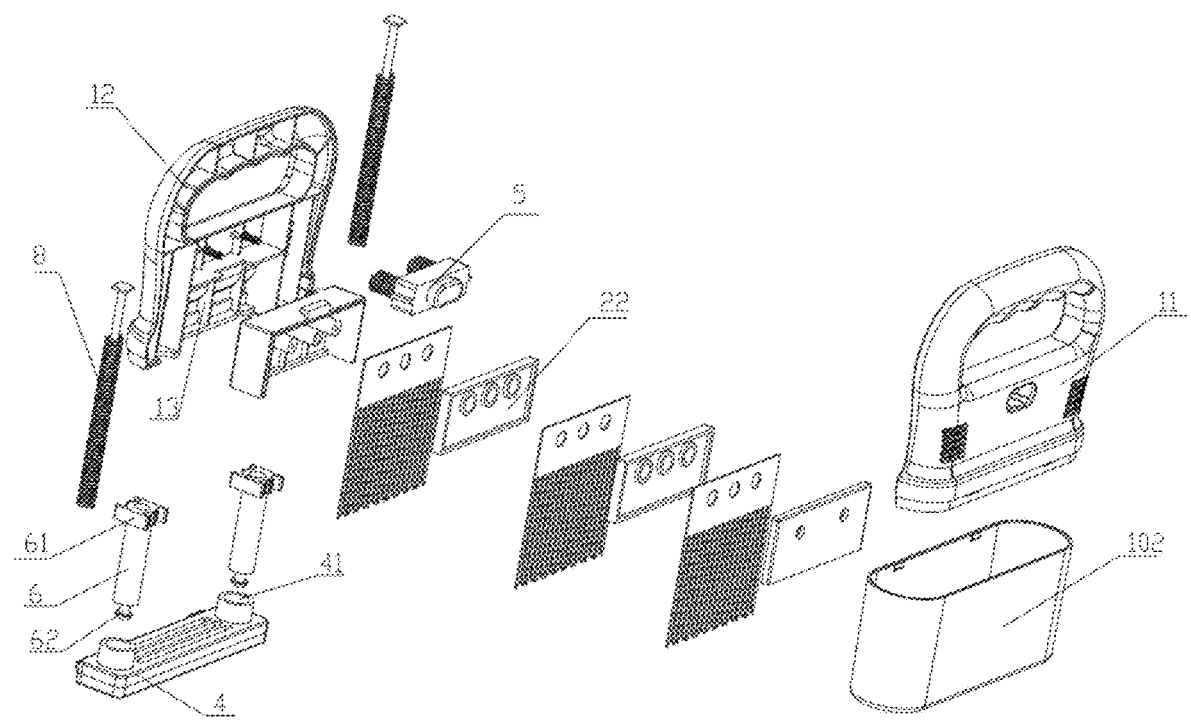
FIG. 3 is an exploded view of the overall structure of the first embodiment of the meat tenderizer of the utility model.

As shown in FIGS. 1 to 3, a detachable and easily cleanable meat tenderizer includes a housing 1, a blade holder 2, a blade 3 and a baffle plate 4.

The housing is divided into a first housing 11 and a second housing 12, wherein the first housing 11 is provided with an insertion hole (not shown) with two open ends, the second housing 12 is provided with an insertion rod (not shown) with an internal thread, the insertion rod is inserted into the insertion hole to connect the first housing 11 to the second housing 12, and then a screw is passed through the insertion hole and locked with the internal thread in the insertion rod, thereby fixing the first housing and the second housing. The housing is detachably designed to facilitate the maintenance and replacement of parts and components later.

Figure 7:
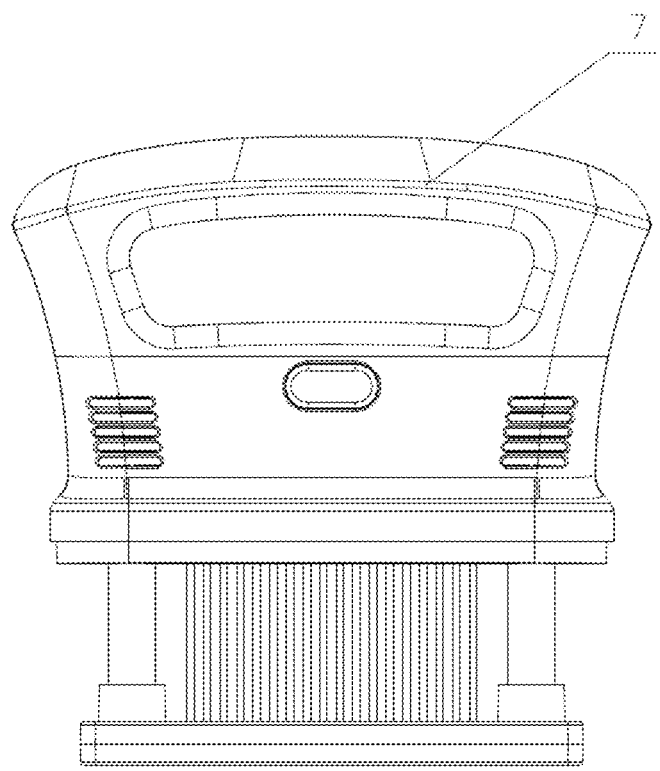
FIG. 7 is a schematic view of the overall structure of a second embodiment of the meat tenderizer of the utility model.

A part of an upper end of the housing is reserved to form a handle 7 integrally formed with the housing. As shown in FIG. 1, in a first embodiment, both sides of the handle are arc-shaped and a lower end of a grip portion is designed to be wave-shaped, which is more conducive to grasping the handle and thus is a humanized design. As shown in FIG. 7, in a second embodiment, the handle has corners on both sides and is like a sector as a whole. Those skilled in the art can also design the handle in other shapes as needed.

Figure 4:
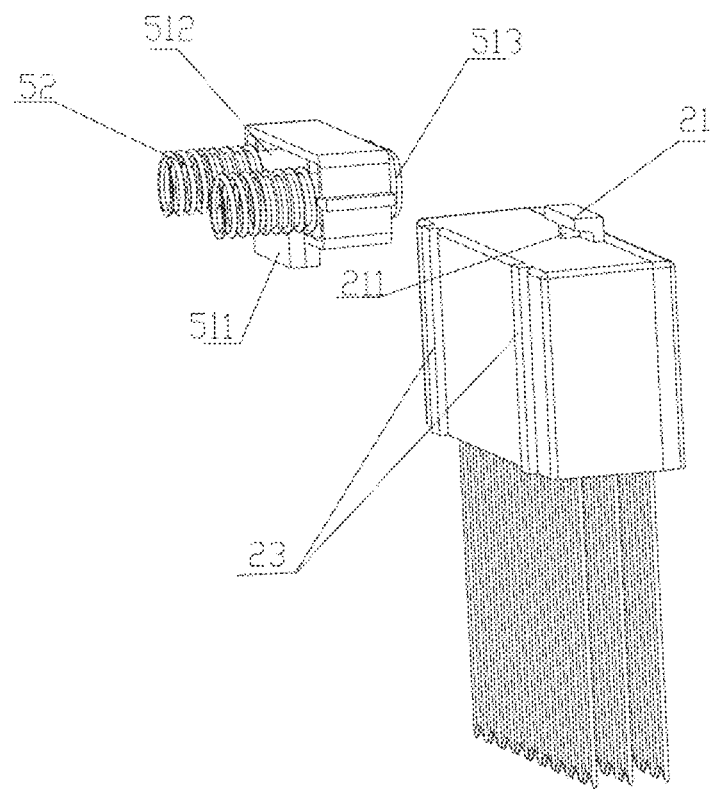
FIG. 4 is a schematic structural view of a clamping-type locking device and a blade holder of the meat tenderizer of the utility model.
Figure 5:
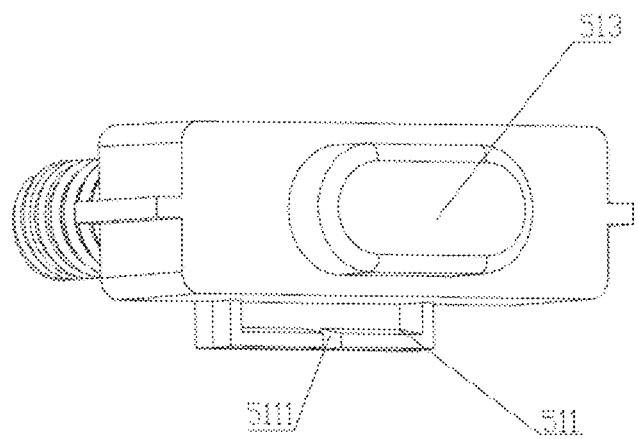
FIG. 5 is a perspective view of the clamping-type locking device of the meat tenderizer of the utility model.

The housing is provided with a chamber 13 that is sized to fit the blade holder 2. The housing is internally provided with a clamping-type locking device 5 which is located at an upper part of the chamber 13, as shown in FIGS. 4 to 5. The clamping-type locking device 5 includes a clamping-type locking body 51 and a return spring 52. The clamping-type locking body is provided with a clamping groove 511 at a lower end thereof, and the shape of the clamping groove is similar to a rectangular parallelepiped with an open side. The clamping-type locking body is provided with two return posts 512 at the rear thereof and the return spring 52 is sleeved on each of the return posts 512. The housing is internally provided with a positioning rod which is inserted into the return post. The positioning post is used to control the direction of each movement of the return post, i.e. each time the button is pressed, the return post and the return spring moves in the direction of the positioning post. The chamber 13 has an opening at a position corresponding to the clamping groove 511, and the clamping groove 511 extends into the chamber through the opening. The clamping-type locking body is provided with a control button 513 in the front thereof, the housing is provided with an opening at a position corresponding to the control button, and the control button extends to the outside of the housing through the opening.

A clamping portion 21 adapted to the clamping groove 511 is arranged at an upper part of the blade holder, and the blade holder is connected to the housing when the clamping portion 21 is clamped into the clamping groove 511. The clamping portion 21 is in the shape of an inverted L, and a connecting piece 211 is arranged in the middle of the clamping portion to divide the clamping portion into two symmetrical portions. A concave opening 5111 is arranged at a position of the clamping groove 511 corresponding to the connecting piece 211, and the connecting piece 211 is clamped into the concave opening 5111 when the clamping portion is clamped into the clamping groove, so that the clamping portion 21 and the clamping groove 511 can be locked more firmly. A side edge of the blade holder protrudes outwards to form a clamping strip 23, and the chamber is provided with a socket for inserting the clamping strip at a position corresponding to the clamping strip.

Through the above technical solution, the detachable connection between the housing 1 and the blade 3 can be achieved by the clamping-type locking device 5. When the control button 513 is pressed, the return spring 52 is compressed and the clamping groove 511 moves towards the compression direction. At this time, the blade holder 2 is placed, the control button 513 is released, then the return spring 52 is reset and the clamping groove 511 is also reset accordingly. The clamping groove is clamped with the clamping portion 21 when moving to the position of the clamping portion 21, and then the blade holder and the blade thereon are connected to the housing. If it is necessary to disassemble the blade holder and the blade thereon from the housing, the control button 513 is pressed again, then the clamping groove is disengaged from the clamping portion, and the blade holder and the blade are taken out.

One end of the blade 3 is mounted in the blade holder 2. According to an embodiment of the utility model, the blade holder is equipped with three rows of blades arranged in parallel. The blades located in the blade holder are separated by partitions 22; the blade holder is internally provided with mounting posts; and the blades and the partitions are both provided with perforations, and are sleeved on the mounting posts through the perforations so as to be fixed in the blade holder. The part of each row of the blades that is not mounted in the blade holder is divided into blade needles arranged at equal intervals. The blade needles have 45-degree sharp corners at lower ends thereof, and the sharp corners of the adjacent blade needles have opposite inclination directions, so that the meat tenderizer is sharper and can cut muscle fibers more efficiently.

Guide posts 6 are arranged on both sides of the blade. The inside of the guide posts is hollow. The guide post is provided with a clamping block 61 at one end thereof and a clamping post 62 at the other end thereof. A tail part of the clamping post takes the shape of an inverted hemisphere. The housing is internally provided with a limiting cavity 14 at a position corresponding to the guide post. The guide post 6 is clamped into the limiting cavity 14 through the clamping block 61, thus enabling the connection with the housing. The limiting cavity is internally provided with a return device 8 which includes a limiting block 81 and a compression spring 82. The limiting block 81 is T-shaped, its horizontal portion abuts on an inner wall of the limiting cavity, the compression spring is sleeved on a vertical portion of the limiting block, and the other end of the compression spring is placed inside the guide post, thus enabling the connection with the guide post.

Figure 6:
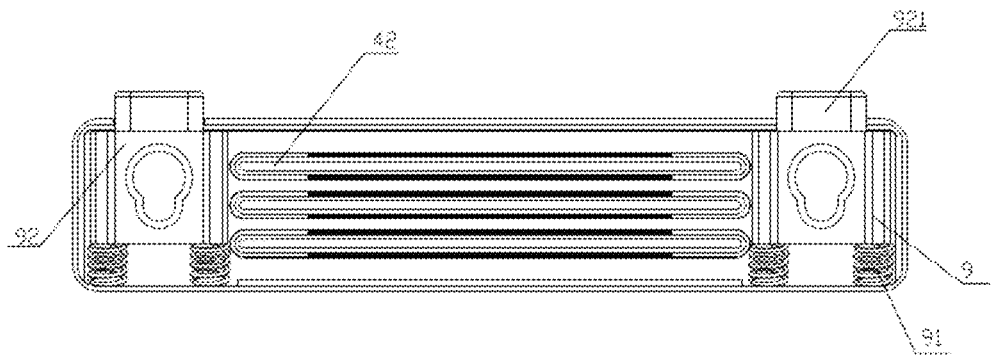
FIG. 6 is a schematic view of the internal structure of a baffle plate of the meat tenderizer of the utility model.

As shown in FIG. 6, buckling devices 9 are arranged on both sides of the baffle plate at positions corresponding to the clamping posts, the buckling device includes a spring 91 and a buckling body 92 with an opening in the middle thereof, the buckling body 92 has limiting holes on both sides thereof, the spring 91 has one end abutting on an inner side wall of the baffle plate and the other end abutting in the limiting hole, an upper end of the buckling body 92 protrudes upwards to form a button 921, the opening of the buckling body takes the shape of one large circle intersecting with one small circle, with the large circle on the top and the small circle at the bottom, the radius of the large circle is greater than that of the tail part of the clamping post, the radius of the small circle is smaller than that of the tail part of the clamping post, the baffle plate 4 is provided with a through hole 41 at a position corresponding to the small circle, and the clamping post 62 of the guide post passes through the through hole 41 on the baffle plate and is connected to the buckling device 9. The baffle plate is also provided with a slot 42 for the blade to pass through.

Through the above technical solution, when the button is pressed down, the buckling device 9 compresses the spring 91, the large circle is moved into the position of the through hole, and then the guide post is placed into the buckling device through the through hole. When the button is released, the spring is reset and the small circle returns to the position of the through hole. Since the radius of the small circle is smaller than that of the tail part of the clamping post, the clamping post 62 is locked in the buckling device, thus enabling the connection between the guide post 6 and the bottom plate 4. When it is necessary to disassemble the guide post from the bottom plate, the button is pressed again in the same step, then the large circle moves to the position of the through hole, and the clamping post is disengaged from the large circle. Those skilled in the art can also come up with other forms to enable the detachable connection between the guide post and the baffle plate.

During use, a user first connects the blade holder 2 and the blade 3 thereon to the housing 1; and the guide post 6 is connected to the baffle plate 4. The meat tenderizer is placed above meat ingredients. The user holds the upper end of the housing and presses the upper end down, the compression spring 82 contracts, the guide post 6 moves towards an upper part of the limiting cavity 14, the housing 1 moves downward with the blade 3, and then the blade 3 passes through the slot 42 on the baffle plate to directly penetrate into meat and cut the fibrous tissue of the meat. When no external force is applied to the housing, the compression spring 82 is reset, and the guide post 6 moves towards a lower part of the limiting cavity to return to the original position.

The housing is provided with several drainage channels 10 on both sides thereof, and stop strips 101 are arranged in the housing at positions corresponding to the drainage channels. The purpose of the drainage channels 10 is to discharge the water retained in the housing. Moreover, the stop strips can prevent foreign matter from entering the housing through the drainage channels and therefore have the function of dust prevention.

The meat tenderizer also includes a protective cover 102 which is connected to a lower end of the housing, and an antislip strip is arranged on an outer surface of the lower end of the housing to prevent the protective cover from falling off. The blade, the guide posts and the baffle plate are wrapped inside the protective cover, thereby reducing the risk of accidental injury by the blade while protecting the parts in the protective cover.

The invention claimed is:

1. A detachable and easily cleanable meat tenderizer,
   including a housing (1), a blade holder (2), a blade (3) and a baffle plate (4);
   one end of the blade (3) being mounted in the blade holder (2);
   the housing being provided with a chamber (13) that is sized to fit the blade holder;
   the housing being internally provided with a clamping-type locking device (5) which is located at an upper part of the chamber;
   the clamping-type locking device including a clamping-type locking body (51) and a return spring (52), the clamping-type locking body being provided with a clamping groove (511) at a lower end thereof, the clamping groove (511) extending into the chamber (13), the clamping-type locking body being provided with a return post (512) at the rear thereof, the return spring (52) being sleeved on the return post (512), the clamping-type locking body being provided with a control button (513) in the front thereof, the housing (1) being provided with an opening at a position corresponding to the control button, and the control button (513) extending to the outside of the housing through the opening;
   a clamping portion (21) adapted to the clamping groove (511) being arranged at an upper part of the blade holder, and the blade holder (2) being connected to the housing (1) when the clamping portion (21) is clamped into the clamping groove (511);
   limiting cavities (14) being arranged on both sides of the housing;
   guide posts (6) being arranged on both sides of the blade, one end of the guide post being located in the limiting cavity of the housing, and the other end of the guide post being detachably connected to the baffle plate;
   the limiting cavity being internally provided with a return device (8), the return device including a limiting block (81) and a compression spring (82) sleeved on the limiting block, and the compression spring being connected to the guide post; and
   the baffle plate being provided with a slot (42) for the blade to pass through.

2. The detachable and easily cleanable meat tenderizer according to claim 1, wherein, a connecting piece (211) is arranged in the middle of the clamping portion, a concave opening (5111) is arranged at a position of the clamping groove corresponding to the connecting piece, and the connecting piece (211) is clamped into the concave opening (5111) when the clamping portion is clamped into the clamping groove.

3. The detachable and easily cleanable meat tenderizer according to claim 1, wherein, a side edge of the blade holder protrudes outwards to form a clamping strip (23), and the chamber is provided with a socket for inserting the clamping strip at a position corresponding to the clamping strip.

4. The detachable and easily cleanable meat tenderizer according to claim 1, wherein, the housing is internally provided with a positioning rod which is inserted into the return post (512), and when the control button (513) is pressed, the return post moves in the direction of the positioning rod.

5. The detachable and easily cleanable meat tenderizer according to claim 1, wherein, a clamping post (62) is arranged at one end of the guide post connected to the baffle plate, a tail part of the clamping post (62) takes the shape of an inverted hemisphere, buckling devices (9) are arranged on both sides of the baffle plate at positions corresponding to the clamping posts, the buckling device includes a spring (91) and a buckling body (92) with an opening in the middle thereof, the buckling body has limiting holes on both sides thereof, the spring has one end abutting on an inner side wall of the baffle plate and the other end abutting in the limiting hole, an upper end of the buckling body protrudes upwards to form a button (921), the opening of the buckling body takes the shape of one large circle intersecting with one small circle, with the large circle on the top and the small circle at the bottom, the radius of the large circle is greater than that of the tail part of the clamping post, the radius of the small circle is smaller than that of the tail part of the clamping post, the baffle plate is provided with a through hole (41) at a position corresponding to the small circle, and the clamping post of the guide post passes through the through hole on the baffle plate and is connected to the buckling device.

6. The detachable and easily cleanable meat tenderizer according to claim 1, wherein, the housing is provided with several drainage channels (10), and stop strips (101) are arranged in the housing at positions corresponding to the drainage channels.

7. The detachable and easily cleanable meat tenderizer according to claim 1, wherein, the blade holder is equipped with three rows of blades arranged in parallel; the blades located in the blade holder are separated by partitions (22); the blade holder is internally provided with mounting posts; and the blades and the partitions are both provided with perforations, and are sleeved on the mounting posts through the perforations.

8. The detachable and easily cleanable meat tenderizer according to claim 7, wherein, the part of each row of the blades that is not mounted in the blade holder is divided into blade needles arranged at equal intervals.

9. The detachable and easily cleanable meat tenderizer according to claim 1, wherein, the meat tenderizer also includes a protective cover (102) which is connected to a lower end of the housing; the blade, the guide posts and the baffle plate are wrapped inside the protective cover; and an antislip strip is arranged on an outer surface of the lower end of the housing.

10. The detachable and easily cleanable meat tenderizer according to claim 1, wherein, the housing has a handle (7) integrally formed with the housing at an upper end thereof.

\* \* \* \* \*